Oct. 27, 1931.  M. C. SMITH  1,828,880

BALL BEARING STUFFING BOX

Filed April 6, 1921

INVENTOR
Marshall Charlock Smith
BY
Chas. W. Mortimer
ATTORNEY

Patented Oct. 27, 1931

1,828,880

UNITED STATES PATENT OFFICE

MARSHALL CHARLOCK SMITH, OF PHILADELPHIA, PENNSYLVANIA, ASSIGNOR TO THE BARRETT COMPANY, A CORPORATION OF NEW JERSEY

BALL-BEARING STUFFING BOX

Application filed April 6, 1921. Serial No. 458,950.

This invention relates to installations where it is desirable to pass a revoluble shaft through an opening and at the same time to have a sufficiently close fit to prevent liquids or fumes from escaping between the shaft and the opening through which it extends. The invention is especialy applicable to a shaft which extends through the cover of a receptacle, the shaft carrying a stirrer for the contents of the receptacle.

Heretofore it has been found in installations of this sort, that if the stirring blades are somewhat unbalanced or if the receptacle contains lumps of material, a considerable amount of vibration is set up, thus causing the hole through which the shaft extends to be worn, or the packing therein to be destroyed, thereby permitting leakage along the shaft.

One of the objects of the present invention is to provide a device which will permit a shaft to revolve readily and at the same time will enable a stuffing box to be used without causing rapid deterioration of the packing material. Another object of the invention is to dispose the bearing elements so that tendency of the stuffing box to cant or get out of place is decreased. Another object is to make provision for ready replacement of worn parts. Another object is to provide for lubrication and also to prevent waste of the lubricant used. Other objects and advantages of the invention will be obvious as the description proceeds.

The invention will be understood from the description in connection with the accompanying drawings, in which Fig. 1 is a sectional plan view along the line 1—1 of Fig. 2 of one embodiment of the invention.

Figure 1:
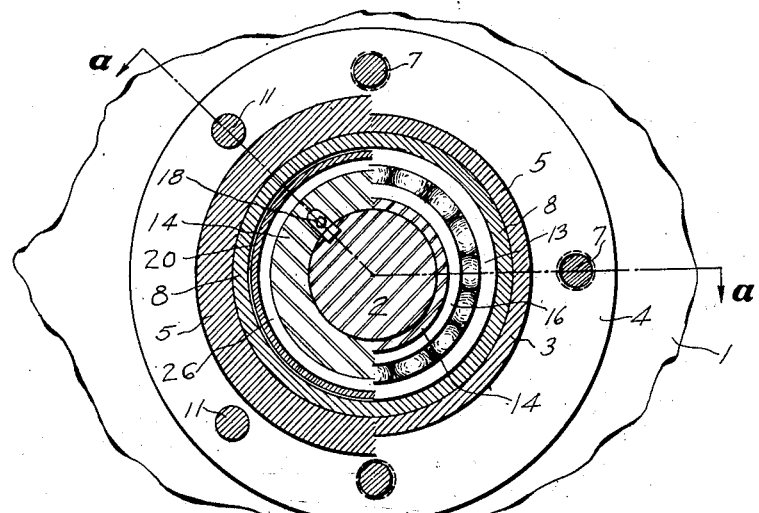
Figure 2:
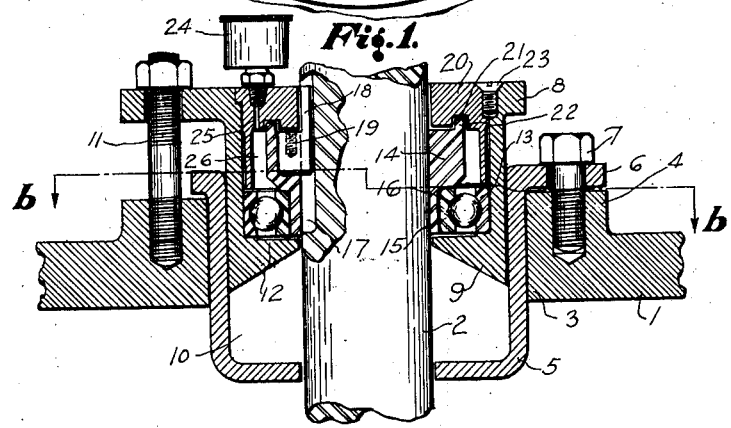
Fig. 2 is a sectional view along the line 2—2 of Fig. 1.

In the drawings reference character 1 designates the top or cover of a receptacle through which the shaft 2 projects. The cover 1 is provided with an opening 3 surrounded by an annular ledge or projection 4. A stuffing box 5, provided with a flange 6, is seated in the opening 3 and is fastened to the cover 1 by means of the bolts 7. A gland 8 having a sloping bottom 9 fits in the stuffing box 5 providing a space 10 for packing material of the usual sort. The gland 8 is fastened to the cover 1 by means of the bolts 11, and near its lower edge is provided with an annular rim or ledge 12 for seating the outer race 13 of a ball-bearing.

A ring 14 is slidably fitted on the shaft 2 in non-rotatable relation with respect thereto and is offset at its lower portion 15 so as to fit tightly within the inner race 16 of the ball-bearing. The shaft 2 is provided with a key-way 17 having a key 18 therein, which key slips into a slot in the ring 14, thereby assuring that the ring 14 will turn with the shaft 2. The key 18 may be provided with a screw hole 19 to permit ready removal of the key.

The gland 8 is provided with a cover or fitting 20 having an annular groove 21 fitting around the annular rim 22 of the ring 14, thus providing a labyrinth channel to prevent the escape of lubricating material. The screw 23 inserted between the cover 20 and the gland 8 prevents the cover 20 from turning, and a grease cup 24 is provided to supply grease through the hole 25 into the space 26 and from thence to the ball-bearing. The ball-bearing is so disposed that it will be in a plane below the upper edge of the ledge 4, thus eliminating the tendency to cant or tilt the parts.

Figure 3:
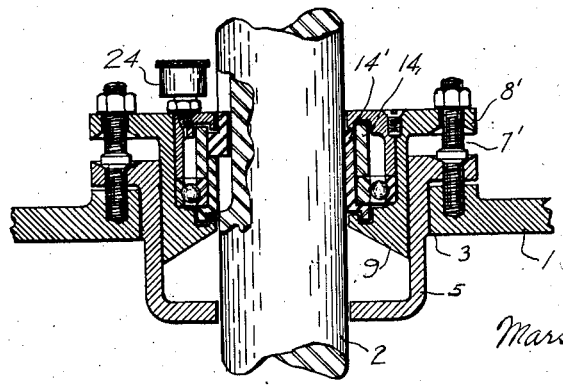
Fig. 3 is a vertical sectional view of a modification of the invention.

The modification shown in Fig. 3 is similar to that above described, except that the bolts 7' hold both the stuffing box 5' and the gland 8' to the cover 1. Also, the supplementary ring $14_1$ and labyrinth channels are provided both at the upper and lower portions of the ring 14' to prevent oil from escaping. The rings $14_1$ and 14' are referred to, in the claims to this modification, as a single ring, and, in fact, they may be so put together that for all practical purposes they constitute a single integral ring.

When it is desired to replace the packing material, the nuts are loosened from the bolts 11 and the gland carrying the ball-bearing etc. is caused to slide the proper distance upwardly along the shaft 2. When it is desired to inspect or clean the ball-bearing, the screw 23 may be removed and the cover 20 slid upwardly, thereby giving access to the parts.

I claim:

1. In combination, a stuffing box, a packing gland in said stuffing box, a ring in said stuffing box having an annular rim on the upper edge thereof and a fitting for said stuffing box covering said packing gland and having an annular groove on the underside thereof in which said annular rim rotatably resides, all of the aforementioned elements being adapted to receive a shaft therethrough and said ring being adapted to be slidably but non-rotatably secured to said shaft.

2. In a stuffing box assembly, a ring having an annular rim upon the upper edge thereof, said ring being adapted to be slidably but non-rotatably secured to the shaft which may pass thru said stuffing box, and a cover for said stuffing box having an annular groove upon the underside thereof into which groove said annular rim rotatably resides to form a labyrinth seal for said stuffing box.

3. In combination, a stuffing box, a packing gland in said stuffing box having a cylindrical body portion with an inside annular shoulder at the lower end thereof, a ball-bearing in said gland having its outer race immovably positioned against said annular shoulder, a ring carried by the inner race of said ball-bearing, said ring having an annular rim upon the upper edge thereof, and a fitting for said stuffing box covering said packing gland and having an annular groove on the underside thereof in which said annular rim rotatably resides, all of the aforementioned elements being adapted to receive a shaft therethrough and said ring being adapted to be slidably but non-rotatably secured to said shaft.

4. In combination, a stuffing box, a packing gland for said stuffing box, a ball-bearing having its outer race immovably positioned in said gland, a ring carried by the inner race of said ball-bearing having an annular rim upon the upper edge thereof and a fitting for said stuffing box covering said packing gland and having an annular groove on the underside thereof in which said rim rotatably resides, all of the aforementioned elements being adapted to receive a shaft therethrough and said ring being adapted to be slidably but non-rotatably secured to said shaft.

5. In combination, a stuffing box, a packing gland in said stuffing box having a cylindrical body portion with an inside annular shoulder at the lower end thereof, said shoulder having an annular groove upon the upper face thereof, a ball-bearing in said gland having its outer race immovably positioned against said annular shoulder, a fitting for said stuffing box covering said packing gland and having an annular groove on the underside thereof and a ring carried by the inner race of said ball-bearing, said ring having an annular rim upon the upper and lower edges thereof which rims rotatably reside in the respective annular grooves, all of the aforementioned elements being adapted to receive a shaft therethrough and said ring being adapted to be slidably but non-rotatably secured to said shaft.

In testimony whereof I affix my signature.

MARSHALL CHARLOCK SMITH.